US011163081B2

(12) United States Patent
Box

(10) Patent No.: US 11,163,081 B2
(45) Date of Patent: Nov. 2, 2021

(54) DE-TRENDING AVO AS A FUNCTION OF EFFECTIVE STRESS

(71) Applicant: Rick A. Box, Houston, TX (US)

(72) Inventor: Rick A. Box, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 698 days.

(21) Appl. No.: 15/913,447

(22) Filed: Mar. 6, 2018

(65) Prior Publication Data

US 2018/0284306 A1    Oct. 4, 2018

Related U.S. Application Data

(60) Provisional application No. 62/478,974, filed on Mar. 30, 2017.

(51) Int. Cl.
  *G01V 1/34*  (2006.01)
  *G01V 1/28*  (2006.01)
  *G01V 1/30*  (2006.01)
  *G01V 1/36*  (2006.01)

(52) U.S. Cl.
  CPC .............. *G01V 1/345* (2013.01); *G01V 1/282* (2013.01); *G01V 1/307* (2013.01); *G01V 1/362* (2013.01); *G01V 2210/632* (2013.01)

(58) Field of Classification Search
  CPC ........ G01V 1/345; G01V 1/362; G01V 1/307; G01V 1/282; G01V 2210/632
  See application file for complete search history.

(56) References Cited

PUBLICATIONS

Simm et al., The anatomy of AVO crossplots, Feb. 2000, The Leading Edge, all pages (Year: 2000).*
Connolly, Elastic reflectivity vectors and the geometry of intercept-gradient crossplots, 2019, The Leading Edge, vol. 38, No. 10, all pages (Year: 2019).*
Thomas et al., Quantitative analysis aspects of the EEI correlation method_2013 SEG, all pages (Year: 2013).*
Waters et al., Interpreting AVO_Find the rocks and the fluids will follow_AVO as a tool for lithology classification May 2014, Interpretation, all pages (Year: 2014).*
Zhang, Effective stress, porosity, velocity and abnormal pore pressure prediction accounting for compaction disequilibrium and unloading, 2013, Elsevier SciVerse Science Direct, all pages (Year: 2013).*
Castagna, Framework for AVO gradient and intercept interpretation_ May-Jun. 1998, SEG, all pages (Year: 1998).*

* cited by examiner

*Primary Examiner* — Manuel L Barbee
(74) *Attorney, Agent, or Firm* — ExxonMobil Upstream Research Company, Law Department

(57) ABSTRACT

A method including: obtaining intercept and gradient stacks and an effective stress volume that correspond to seismic data for a subsurface region; determining Chi angles as a function of effective stress; and generating a seismic volume with the Chi angles that vary as a function of effective stress.

9 Claims, 5 Drawing Sheets

DE-TRENDING AVO AS A FUNCTION OF EFFECTIVE STRESS

CROSS-REFERENCE TO RELATED APPLICATION

This application claims the benefit of U.S. Provisional Patent Application 62/478,974 filed Mar. 30, 2017 entitled DE-TRENDING AVO AS A FUNCTION OF EFFECTIVE STRESS, the entirety of which is incorporated by reference herein.

TECHNOLOGICAL FIELD

This disclosure relates generally to the field of geophysical prospecting, including reservoir delineation. More particularly, exemplary embodiments describe an approach of combining intercept (A) and gradient (B) seismic volumes into a projection volume, in which the projection angle (Chi) is not constant, but is rather a spatially-varying function of effective stress (ES).

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

In the data acquisition stage, a seismic source is used to generate a physical impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface geologic structure from the recorded seismic data for use during the data interpretation stage. The image is developed using theoretical and empirical models of the manner in which the seismic signals are transmitted into the earth, attenuated by the subsurface strata, and reflected from the geologic structures. The quality of the final product of the data processing stage is heavily dependent on the accuracy of the procedures used to process the data.

The purpose of the data interpretation stage is to determine information about the subsurface geology of the earth from the processed seismic data. For example, data interpretation may be used to determine the general geologic structure of a subsurface region, or to locate potential hydrocarbon reservoirs, or to guide the development of an already discovered reservoir. Obviously, the data interpretation stage cannot be successful unless the processed seismic data provide an accurate representation of the subsurface geology.

AVO (amplitude variation with offset) crossplots are a simple way to represent AVO data. AVO analysis is a conventional technique used to evaluate reservoir porosity, density, velocity, lithology, and fluid content. In the oil and gas industry, it is a common practice to make projection volumes using a constant Chi angle with the formula Proj=A cos(Chi)+B sin(Chi), where Chi is a constant angle chosen to locally optimize some feature of interest (equation 1).

Given that A is the Intercept volume, which responds to acoustic contrasts, and B is the Gradient volume, which responds to elastic contrasts, the Projection (Proj) volume is a hybrid, whose overall scaling matches that of A and B, because of the property of a unit circle (that is, $\sin^2(Chi)+\cos^2(Chi)=1$) (equation 2).

The intercept-gradient crossplot is widely used for amplitude-variation-with-offset (AVO) analysis in hydrocarbon exploration. The intercept is the zero offset or normal incidence reflection amplitude/coefficient of an event while the gradient is the change in reflection amplitude/coefficient with offset at normal incidence. Studies are done to determine where the reflections between layers of differing lithology, porosity, fluid content, or other attributes fall in intercept-gradient space; a Chi angle is chosen to form a projection using equation 1 that accentuates some feature of interest at the expense of others (for example, making water-bearing sandstones have weaker projection amplitude than oil-bearing sandstones). For a local region around the study, this allows seismic interpretation to be clearer, and more quickly carried out; but for the rest of the seismic volume, this projection is counter-productive, and must be discarded.

SUMMARY

A method, including: obtaining intercept and gradient stacks and an effective stress volume that correspond to seismic data for a subsurface region; determining Chi angles as a function of effective stress; and generating a seismic projection with Chi being a function of effective stress.

In the method, the effective stress volume can be determined from a pore pressure prediction process.

In the method, the determining can be based on empirical analysis over a plurality of hydrocarbon fields with different effective stress.

In the method, the determining can be based on well log modeling.

In the method, the generating the seismic projection can include performing a Chi stack with projection=A cos(Chi)+B sin(Chi), where A is the intercept, B is the gradient, and Chi is a spatially varying function of the effective stress.

In the method, the generating can include de-emphasizing non-hydrocarbon fluids.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF EXAMPLE EMBODIMENTS

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Examples discussed herein compare sandstones containing oil to sandstones containing water, but this is for illustration only; the method is the same for other fluids (particularly natural gas, but also carbon dioxide, helium, tar, etc.) in any porous reservoir rock (limestone, dolomite, etc.)

The present technological advancement can be embodied as a method for making the AVO appearance (AVO class) of seismic data much more invariant laterally and vertically. Seismic data exhibits a different character at different places because the rock properties change with compaction, which is controlled by effective stress (ES), which varies spatially. Consequently, qualitative seismic interpretation methods have been different in different settings (commonly described as AVO Classes 4, 3, 2n, 2p, and 1), and quantitative methods (such as Chi stacking) have been done very locally. The present technological advancement measures and removes this variation so that like geologic features will appear much more alike on seismic data throughout the volume.

By way of a non-limiting example, the projection of equation 1 can choose Chi in such a way as to zero out the reflectivity of some particular wet sand, making any remaining reflectivity interpretable as hydrocarbons; however, many other projections are possible. Conventional methods are only providing a local solution, and cannot be relied upon at any other place, even in the same sand, because effective stress most likely will have changed, changing the compaction state of the rocks, and making a different Chi angle required. The present technological advancement provides a global solution because it allows Chi to vary with effective stress.

The present technological advancement includes a change, relative to what is discussed above, to the formula for the projection volume
Proj=A cos(Chi[ES])+B sin(Chi[ES]), where Chi is a spatially-varying function of ES, chosen to globally optimize some feature of interest.

By finding the optimal Chi for several known oil accumulations of varying ES in the same basin, it has been observed that Chi is a smooth function of ES. Therefore, with spline fitting, a function can be made that interpolates between the fields and extrapolates to the highest and lowest ES present.

Figure 1:
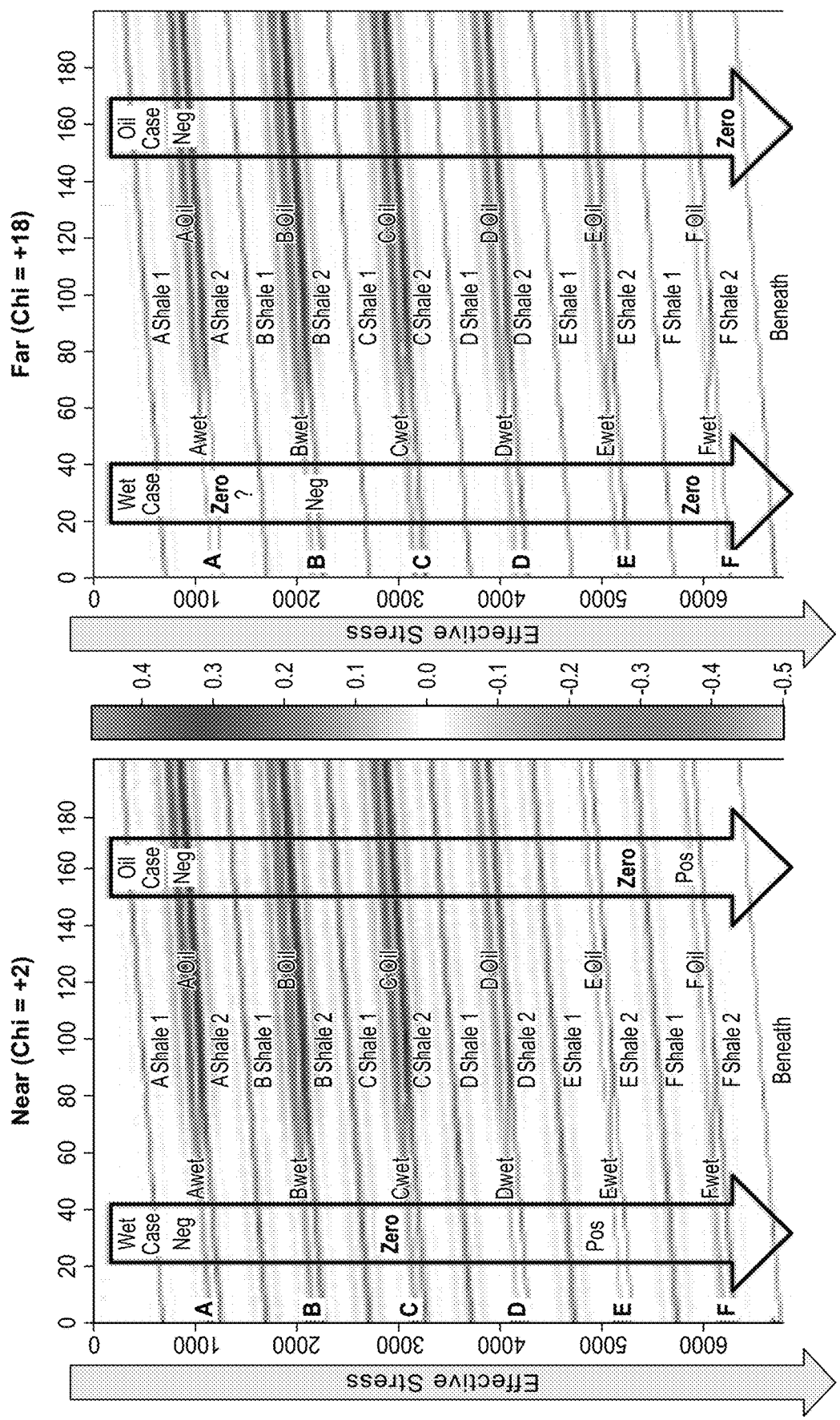
FIG. 1 illustrates conventional practice of making near and far angle stacks.

FIG. 1 illustrates the common industry practice of making near and far angle stacks, and the fact that the difficulty involved in distinguishing oil sands from water sands and shales changes with effective stress, generally increasing. In FIG. 1, six sands of identical geometry containing the same type of oil and the same type of water, embedded in the same type of shale are shown; the seismic signatures are far from identical, because effective stress increases, compacting the rocks. Using these products, seismic interpretation is the difficult art of deducing the layer's geology despite this strong overprint of the compactional context.

In FIG. 1, six oil deposits (A through F) are modeled: they have exactly the same geometry, but have different effective stress. Where effective stress is high, some combination of deeper burial, lower fluid pressure, and greater age has caused the rocks to be more compacted—this applies both to the sandstone (bearing oil to the right and water to the left) and the surrounding shales. The seismic responds to the contrasts between layers, and thus varies with effective stress in a complex way. In some cases, such as layer B, both near and far stacks exhibit a dramatic change from left to right, which may be successfully interpreted as the change from water to oil inside the pore spaces of the sandstone. In other cases, such as layer E, the change is so small as to probably be dismissed, or interpreted as being due to some other cause.

Figures 2A, 2B:
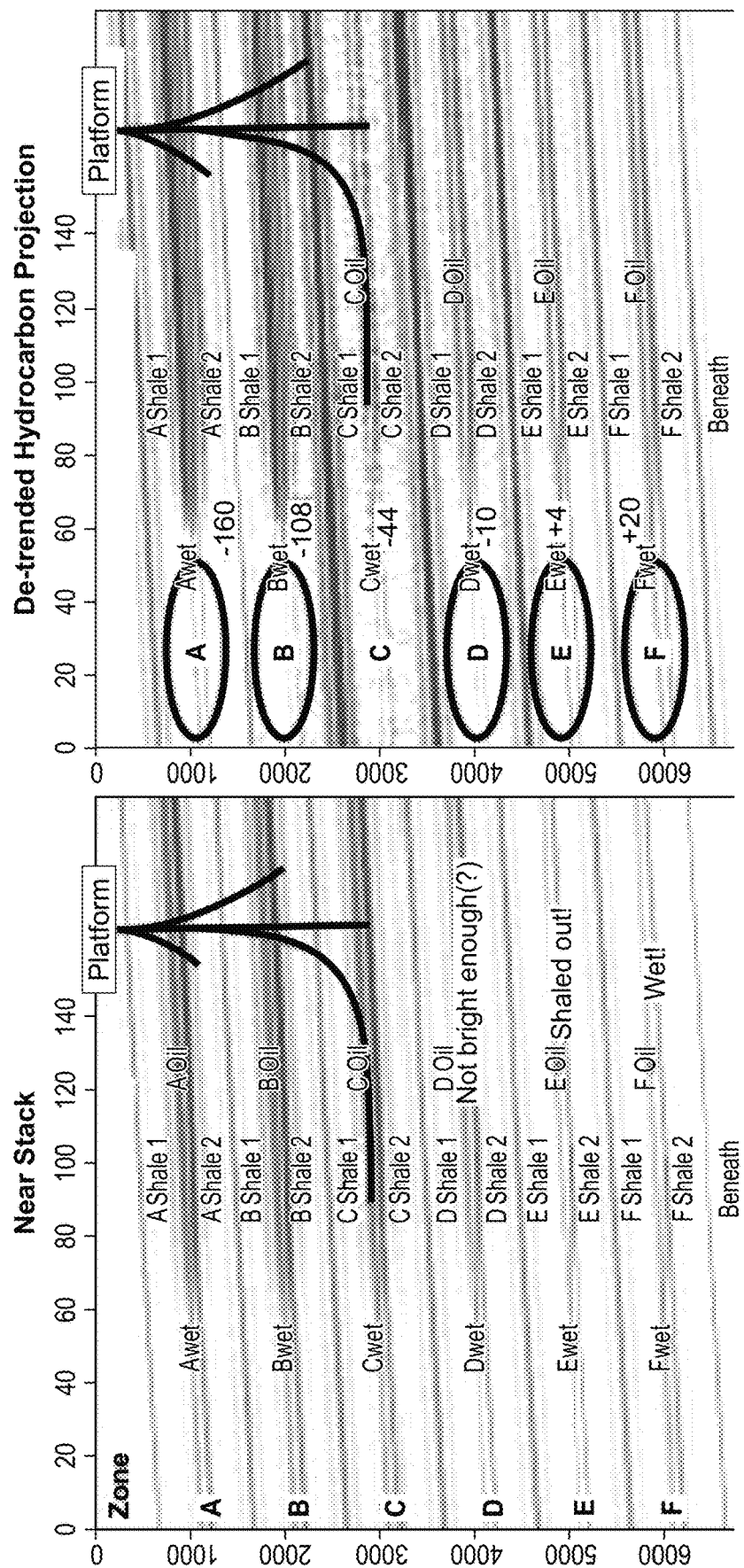
FIGS. 2A and 2B illustrate a contrast between the present technological advancement and conventional practice.

FIGS. 2A and 2B show the contrast between the present technological advancement and the common industry practice. Hydrocarbons are not always distinguishable from brines on conventional stacks (FIG. 2A) because their effects are blended with lithologic and tuning effects, and vary with effective stress. Even when wells (green lines) have been drilled to shallow layers, the decision to drill to deeper layers may be difficult. FIG. 2B shows what happens if a projection using variable Chi is used. This is a generalization of industry practice, where Chi is a constant. The amplitudes of the reflections from water sands, along the left of the diagram (see the ovals), have been made to be zero, so that the reflections that remain, to the right, are more clearly interpreted as being oil. This is contrasted with the conventional practice in FIG. 2A, wherein the amplitude changes for layers D, E, F are not bright enough to be meaningfully interpreted. By removing the stress trend, shallow plays can be compared to deep ones effectively. By determining the compactional effect, and removing it, the six layers are far more similar, making interpretation less difficult.

The arrows extending to platform are well paths. It could be that a near-vertical well was drilled to discover three pay zones, and then further wells, deviated or even horizontal, were drilled to drain the reserves. However, spending money to drill deeper is not obvious to those of ordinary skill in the art, wherein conventional technology does not permit shallow plays to be effectively compared to the deep ones.

The polarity of layers A and B are positive; polarity of D, E, and F are negative; C is near the cross-over point, and has weak amplitude. Shallow plays are strongly positive, then weaken, then vanish (cross-over point), and then become strongly negative as depth increases. This amplitude weakness at the crossover point is an inescapable drawback of the present technological advancement. Fortunately, the conventional method works quite well in layer C, so it can be used instead. The Chi values used range from −160 to +20 degrees.

Figure 3:
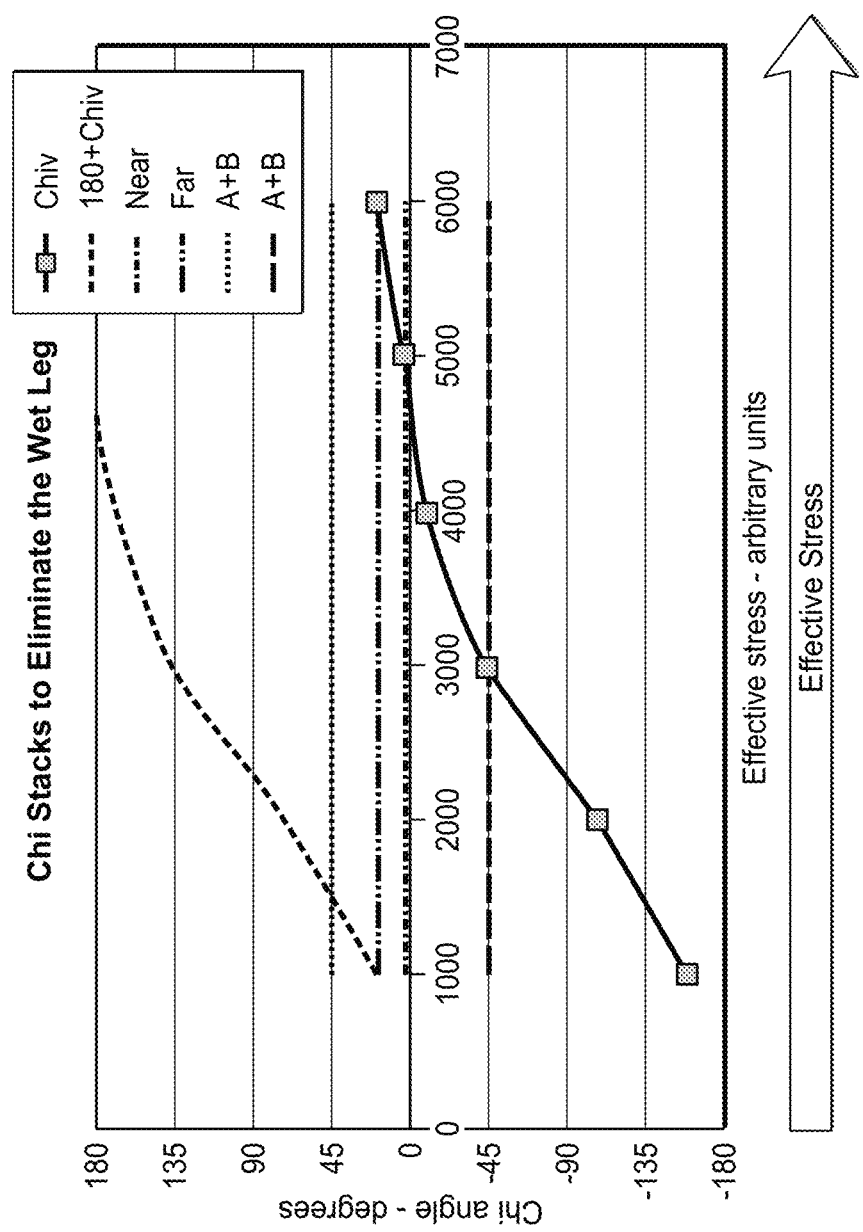
FIG. 3 illustrates how the Chi angles involved in constructing the seismic stacks vary with effective stress, and that they do not in conventional practice.

FIG. 3 illustrates that the Chi angles involved in constructing the seismic stacks in the present technological advancement vary with effective stress, whereas the conventional industry stacks do not. The Chi angles used to emphasize the hydrocarbons (by de-emphasizing the water) are shown in bold solid line with squares, forming a very simple, smooth function of effective stress. Several other stacks, commonly used in the industry, are shown for comparison: all are constant-Chi stacks, so they form horizontal lines. Each of them crosses the ChiV (used to denote a variable Chi as opposed to the conventional constant Chi) line (or its mirror image) somewhere, so they can effectively show the difference between hydrocarbon and water locally, but not globally (throughout an entirety of the seismic volume). Because effective stress drives compaction, which drives rock properties, which drives A and B response, which implies a most-effective Chi angle, a stack that is going to be globally effective has to be sloped, not horizontal. Articles in the literature showing that one of these horizontal stacks is effective in some locale could easily be true, but a diagonal stack could match it locally while remaining valid for other values of ES.

Figure 4:
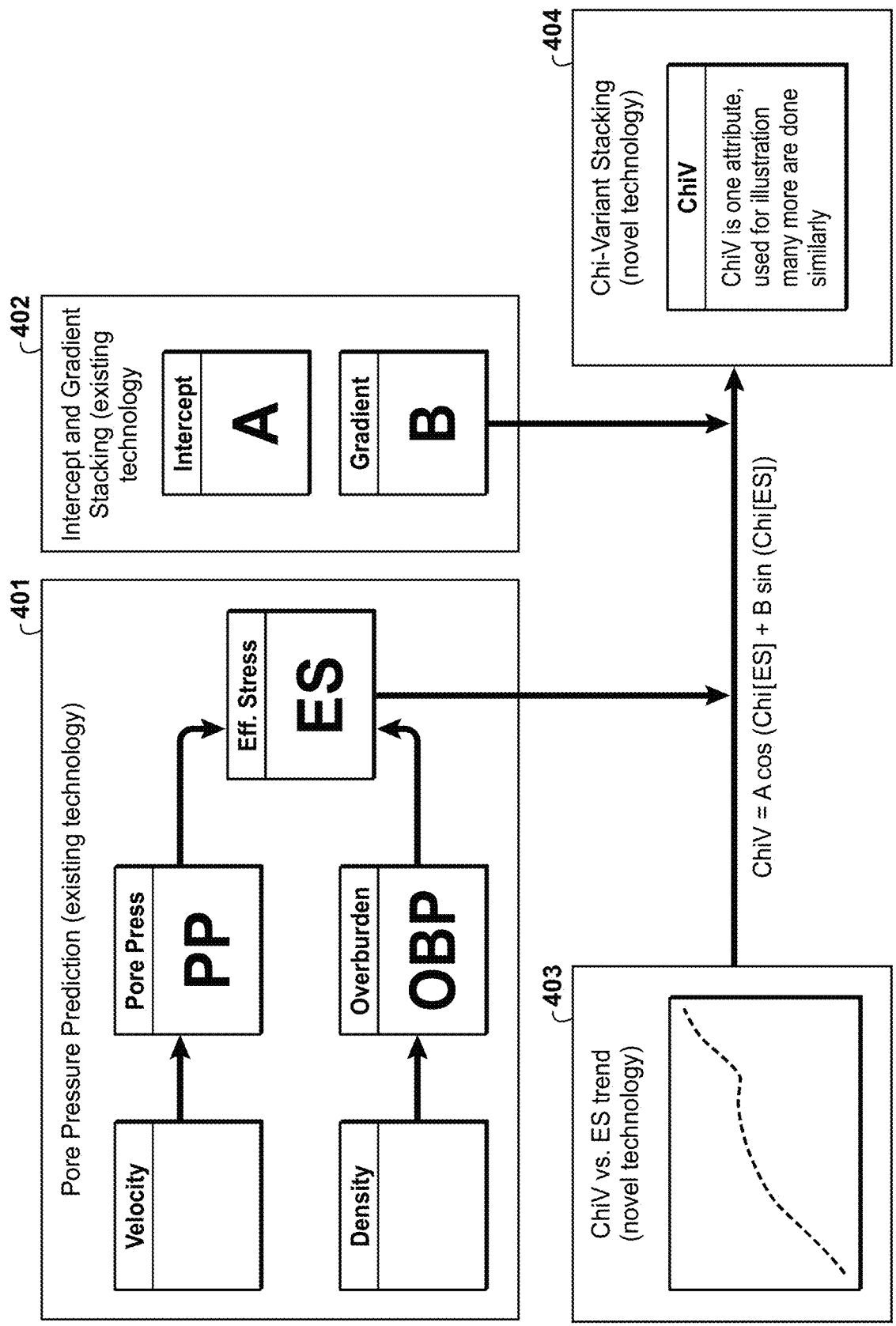
FIG. 4 illustrates a method embodying the present technological advancement.

FIG. 4 illustrates a method for making one output seismic volume (where the Chi angles vary spatially as a function of effective stress), saving considerable time and labor when compared to the common industry practice of making many chi-invariant stacks, and using each locally. The industry common practice is to consider each locality separately; if there are N of these, then N different volumes must be built, and each interpreted separately. Using the present technological advancement, on the other hand, once the ES volume and the function relating Chi to ES are built, a single volume is built and interpreted.

Step 401 includes, at multiple locations within the seismic volume, determining effective stress and optimal Chi angle. In the context of the example of FIG. 2, the optimal Chi angle is the specific value of ChiV that makes the water-sand reflections on the left diminish; however, for other projections the optimal Chi angle will be determined on a case-by-case basis in order to achieve the desired result. A process called "pore pressure prediction" is routinely done by those of ordinary skill in the art to determine overburden pressure (OBP), effective stress (ES) and pore pressure (PP). The pore pressure is the most important output for the purpose of drilling with the appropriate technology to avoid well blowouts and related drilling problems. However, for purposes of the present technological advancement, the important output is ES, as it relates to Chi. However, any method for determining effective stress can be used with the present technological advancement.

Step 402 includes making Intercept and Gradient (A and B) stacks. This is routine to those of ordinary skill in the art. Care should be taken to assure that the amplitude scaling and frequency content are the same in B as in A.

Step 403 includes deriving a function that relates ChiV to changes in effective stress (ChiV=f(ES)). The ES and optimal Chi angle can be determined for multiple locations within the seismic volume. ChiV (the Chi being used for the purpose at hand in this example) can be plotted against ES at several points in order to derive therefrom a trend by splining or another interpolation technique. One way to do this is by well log modeling. If Vp, Vs, and Rho logs are available and valid, then fluid substitution or similar methods can be used to compute the oil case from the water case, or vice versa. This allows for computation of the optimal Chi value. This should be done at several different ES locations. Another way to do this is by empirical analysis. If seismic A and B stacks are available over several oil fields with differing ES, then the optimal Chi values for different ES conditions can be found by exhaustively testing all values. It is also possible to use a combination of empirical seismic analysis and well log modeling, depending upon the types of data available.

By way of example, in siliciclastic basins, this relationship has been found to form a smooth curve do to the dominance of compaction on rock properties.

In step 404, using equation 2 above, the desired stack is produced. The ChiV attribute has been used throughout, here, for illustrative purposes. However, the present technological advancement can work with other attributes.

In the petroleum business, the decision to drill a well is almost always based on seismic data, and involves weighing the potential size of the hydrocarbons to be found versus the cost and the chance that the seismic interpretation may be wrong. Thus, reducing the risk of incorrect seismic interpretation is crucial to good business decisions. Results from the present technological advancement can be used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from the subsurface image.

Figure 5:
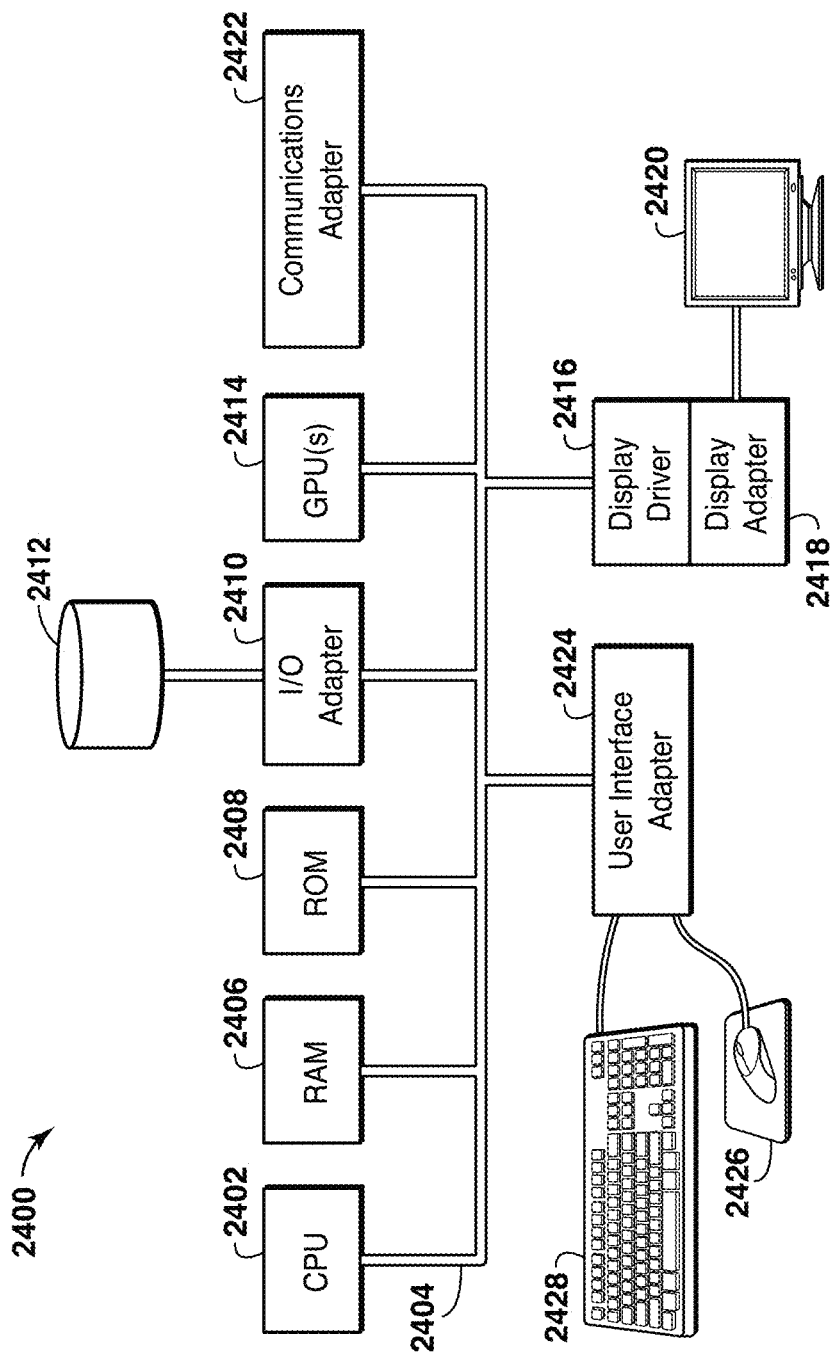
FIG. 5 illustrates a computer system that can execute the present technological advancement.

FIG. 5 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 5, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, clusters, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

The invention claimed is:

1. A method, comprising:
   obtaining intercept and gradient stacks that correspond to seismic data for a subsurface region;
   determining an effective stress at multiple locations within a volume that corresponds to the seismic data for the subsurface region;
   determining Chi angles as a function of the effective stress;
   generating a seismic projection for the volume with Chi being a function of effective stress, wherein generating the seismic projection includes performing a Chi stack with projection=A cos(Chi)+B sin(Chi), where A is the intercept, B is the gradient, and Chi is a spatially varying function of the effective stress; and
   using the seismic projection to manage hydrocarbons within the subsurface region.

2. The method of claim 1, wherein the effective stress is determined from a pore pressure prediction process.

3. The method of claim 1, wherein determining Chi angles is based on empirical analysis over a plurality of hydrocarbon fields with different effective stress.

4. The method of claim 1, wherein determining Chi angles is based on well log modeling.

5. The method of claim 1, wherein generating the seismic projection includes de-emphasizing non-hydrocarbon fluids.

6. The method of claim 1, further comprising using the seismic projection to identify potential hydrocarbon resources in the subsurface region or identifying reservoir connectivity in the subsurface region.

7. The method of claim 1, further comprising using the seismic projection to identify a hydrocarbon deposit within the subsurface region.

8. The method of claim 7, further comprising causing a well to be drilled that targets the identified hydrocarbon deposit.

9. The method of claim 1, wherein determining Chi angles as a function of the effective stress comprises:
   determining an optimal Chi angle at multiple locations within the volume;
   plotting the optimal Chi angle and determined effective stress to derive the function by splining or another interpolation technique.

* * * * *